US012257535B2

(12) United States Patent
Coste et al.

(10) Patent No.: US 12,257,535 B2
(45) Date of Patent: Mar. 25, 2025

(54) FILTER CARTRIDGE FOR A LIQUID SUCH AS FUEL, THE UPPER END PLATE OF WHICH INCLUDING AN AUTOMATIC DEGASSING VALVE

(71) Applicant: VOLVO TRUCK CORPORATION, Gothenburg (SE)

(72) Inventors: Hervé Coste, Roche (FR); Baptiste Boutin, La Tour du Pin (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 332 days.

(21) Appl. No.: 17/755,255

(22) PCT Filed: Oct. 29, 2019

(86) PCT No.: PCT/EP2019/079476
§ 371 (c)(1),
(2) Date: Apr. 25, 2022

(87) PCT Pub. No.: WO2021/083491
PCT Pub. Date: May 6, 2021

(65) Prior Publication Data
US 2022/0355229 A1   Nov. 10, 2022

(51) Int. Cl.
*B01D 33/70* (2006.01)
*B01D 29/15* (2006.01)
*B01D 36/00* (2006.01)

(52) U.S. Cl.
CPC ............ *B01D 36/001* (2013.01); *B01D 29/15* (2013.01); *B01D 2201/291* (2013.01); *B01D 2201/64* (2013.01)

(58) Field of Classification Search
CPC ............ B01D 36/001; B01D 2201/291; B01D 35/153; B01D 29/15; F02M 37/54; F02M 37/22; F02M 37/32
(Continued)

(56) References Cited

U.S. PATENT DOCUMENTS 7,938,958 B2 * 5/2011 Core .................... B01D 36/001
96/219
2009/0178977 A1   7/2009 Core et al.
(Continued)

FOREIGN PATENT DOCUMENTS

CN        103189634 A        7/2013
CN        203862007 U       10/2014
(Continued)

OTHER PUBLICATIONS

Chinese Office Action dated Jan. 26, 2024 in corresponding Chinese Patent Application No. 201980101429.0, 19 pages.
(Continued)

*Primary Examiner* — Long T Tran
*Assistant Examiner* — James J Kim
(74) *Attorney, Agent, or Firm* — Venable LLP; Jeffri A. Kaminski

(57) ABSTRACT

The invention relates to a filter cartridge (32) for a liquid such as fuel, said filter cartridge being intended to be positioned inside a filter housing (30) and comprising a filter media (38) defining an inner volume (V38), a lower end plate (40), and an upper end plate (42), including a liquid passage opening (O42), which communicates with the inner volume of the filter media. The upper end plate (42) includes an automatic degassing valve (50).

17 Claims, 8 Drawing Sheets

(58) Field of Classification Search
USPC .......................................................... 210/120
See application file for complete search history.

(56) References Cited

U.S. PATENT DOCUMENTS

| | | |
|---|---|---|
| 2009/0230063 A1 | 9/2009 | Hawkins et al. |
| 2010/0108590 A1 | 5/2010 | Curt et al. |
| 2010/0193044 A1* | 8/2010 | Wulffen ............... B01D 29/114 |
| | | 137/238 |
| 2013/0180898 A1 | 7/2013 | Chajec et al. |
| 2014/0034566 A1 | 2/2014 | Verdegan et al. |
| 2016/0230733 A1* | 8/2016 | Grange .................. F02M 37/32 |
| 2017/0296947 A1* | 10/2017 | Chikugo .................. F15B 1/26 |

FOREIGN PATENT DOCUMENTS

| | | |
|---|---|---|
| CN | 104204496 A | 12/2014 |
| CN | 105451852 A | 3/2016 |
| CN | 108883353 A | 11/2018 |
| DE | 102014209595 A1 | 11/2015 |
| EP | 3567242 A2 | 11/2019 |
| FR | 2751699 A1 | 1/1998 |
| FR | 2830284 A1 | 4/2003 |
| FR | 2834007 A1 | 6/2003 |
| JP | S6397702 U | 6/1988 |
| WO | 2019077450 A1 | 4/2019 |

OTHER PUBLICATIONS

International Search Report and Written Opinion dated Jun. 29, 2020 in corresponding International PCT Application No. PCT/EP2019/079476, 9 pages.

European Office Action dated Aug. 7, 2023 in corresponding European Patent Application No. 19797232.6, 4 pages.

* cited by examiner

FILTER CARTRIDGE FOR A LIQUID SUCH AS FUEL, THE UPPER END PLATE OF WHICH INCLUDING AN AUTOMATIC DEGASSING VALVE

CROSS-REFERENCE TO RELATED APPLICATIONS

This application is a U.S. National Stage application of PCT/EP2019/079476, filed Oct. 29, 2019 and published on May 6, 2021, as WO 2021/083491A1, all of which is hereby incorporated by reference in its entirety.

TECHNICAL FIELD

The invention concerns a filter cartridge for a liquid such as fuel.

In internal combustion engines, it is necessary to filter and degas the fuel before introducing it into the carburettor to remove all impurity particles suspended therein, as well as gas and air bubbles that are released from the fuel as a result of the increased temperature in the engine compartment.

Thus, it is known to filter the fuel transported from the tank to the combustion cylinders of the engine. In particular, in trucks, two filters are most often used, namely a first upstream filter called "pre-filter" and a second downstream filter called "main filter".

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

During filter changes, the fuel system is at least partially drained. The filters are then filled with air. However, it is important to avoid that, when starting the engine, the fuel sent into the combustion cylinders is mixed with air. Therefore, the main filter, which is located downstream of the pre-filter on the fuel path from the tank to the engine, includes a degassing valve to discharge the air volume inside the filter.

FR 2 751 699 discloses a fuel filter with a ventilation line to exhaust the air contained inside the filter into the atmosphere. A specific box is connected to the ventilation duct. This box contains a check valve designed to let air escape only, i.e. this valve remains open as long as air passes through the ventilation line and closes automatically when liquid tries to escape through the ventilation line.

FR 2 834 007 discloses a filter in which the upper part of the filter body includes a purge screw, by means of which the air can be evacuated by manually unscrewing the screw.

FR 2 830 284 discloses a filter in which the filter housing includes, in the upper part, i.e. in the cover, an automatic degassing valve. This valve includes a float that does not prevent air from escaping, but which rises in the presence of liquid by Archimedes' thrust, to stop against a seat and close the valve.

The problem with this construction is that it does not prevent the motor from operating in the absence of a filter cartridge. Indeed, even without a cartridge, the fuel is pumped to the engine's combustion cylinders. The risk is therefore to clog the engine parts and cause irreparable damage.

US 2010/108590 A1, US 2013/180898 A1 and US 2009/0230063 A1 each disclose a filter element in which one of the end plates includes a valve. This valve is located in the center of the plate. It opens in case of overpressure in order to regulate the pressure inside the filter. Thus, this type of valve cannot be considered as a degassing valve because its function is not to purge the air, for example when changing of cartridge, but to lower the pressure inside the filter, for example in the volume above the cartridge. Also, a degassing valve closes in case of overpressure, while a pressure relief or pressure regulation valve opens in case of overpressure.

SUMMARY

It is these disadvantages that the invention intends to remedy in particular, by proposing a new filter cartridge, without which the engine cannot operate ("no filter no run").

This filter cartridge includes the features of claim 1.

Thanks to the invention, and assuming that there is no filter cartridge inside the filter, the fuel arriving inside the filter through the intake duct will fully exit through the tank return duct, which is normally designed to discharge the air or gases present in the filter back to the tank. Indeed, the return line to the tank is a line in which there are very few pressure drops, at least compared to the line carrying fuel to the engine cylinders. Thus, and without fuel, the engine will not be able to start. Conversely, when the filter cartridge is in place inside the filter housing, the degassing valve prevents the fuel (liquid) from flowing through the return line to the tank. This valve is only used to evacuate the air or gases contained inside the filter. Typically, when the filter cartridge is changed, the filter is filled with air. At least the first time the engine is started, the air inside the filter is discharged to the tank. This avoids sending air into the engine's fuel supply system.

Further advantages and advantageous features of the invention are disclosed in the following description and in the dependent claims 2 to 13.

The invention also concerns a filter.

Eventually, the invention relates to a vehicle.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
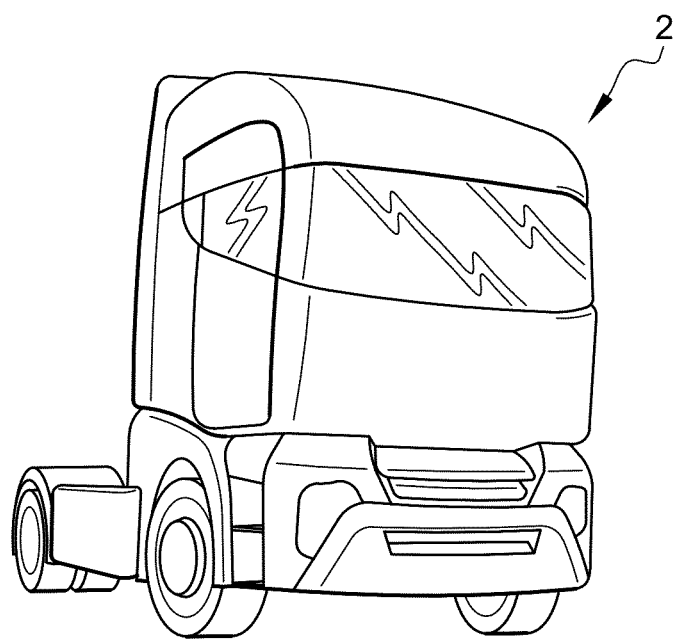
FIG. 1 is a perspective view of a vehicle, in particular a truck, comprising an internal combustion engine arrangement.

FIG. 1 shows a vehicle 2, in particular a truck. This vehicle 2 includes an internal combustion engine, of which only the injection system 20 is shown in the figures. There is also a fuel tank 4, a pre-filter 6 (optional), a main filter 12 and a low-pressure pump 10, all of which form the internal combustion engine system shown in detail in FIG. 2.

Figure 2:
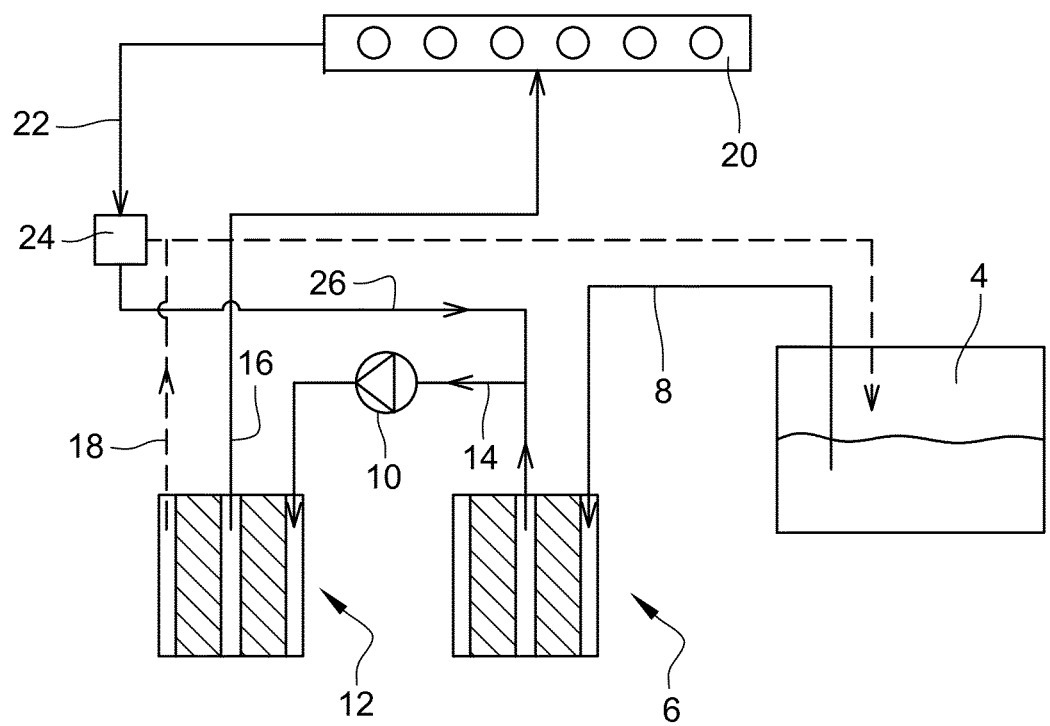
FIG. 2 is a scheme of the internal combustion engine arrangement of the vehicle of FIG. 1, which is provided with a fuel filter according to the invention.

As shown in FIG. 2, fuel tank 4 is connected to pre-filter 6 by a line 8. Pre-filter 6 includes a tubular filter media that is passed through by the fuel from the outside to the inside. This means that the unfiltered fuel arrives in a chamber around the filter media, passes through the media and reaches the central chamber of the filter media. A pump 10, called a low-pressure pump, draws fuel from the outlet of pre-filter 6 through a line 14 and delivers fuel to the inlet of the main filter 12.

The fuel exits filter 12 through a line 16 that carries it to the engine's injection system 20.

Advantageously, the injection system 20 includes what are called pump injectors, which draw fuel from the main filter to the injection system 20, but alternatively, a pump, often called a high-pressure pump, could be used to transport fuel from filter 12 to the injection system 20.

The system also includes a line 22 to discharge the amount of fuel that was not burned during combustion. In practice, it is a fuel-gas mixture that comes out of the engine's combustion cylinders. Also, a separation valve 24 separates the liquid from the gases: The liquid is sent to the suction line 14 of the low-pressure pump 10, while the gases are returned to tank 4.

Figure 3:
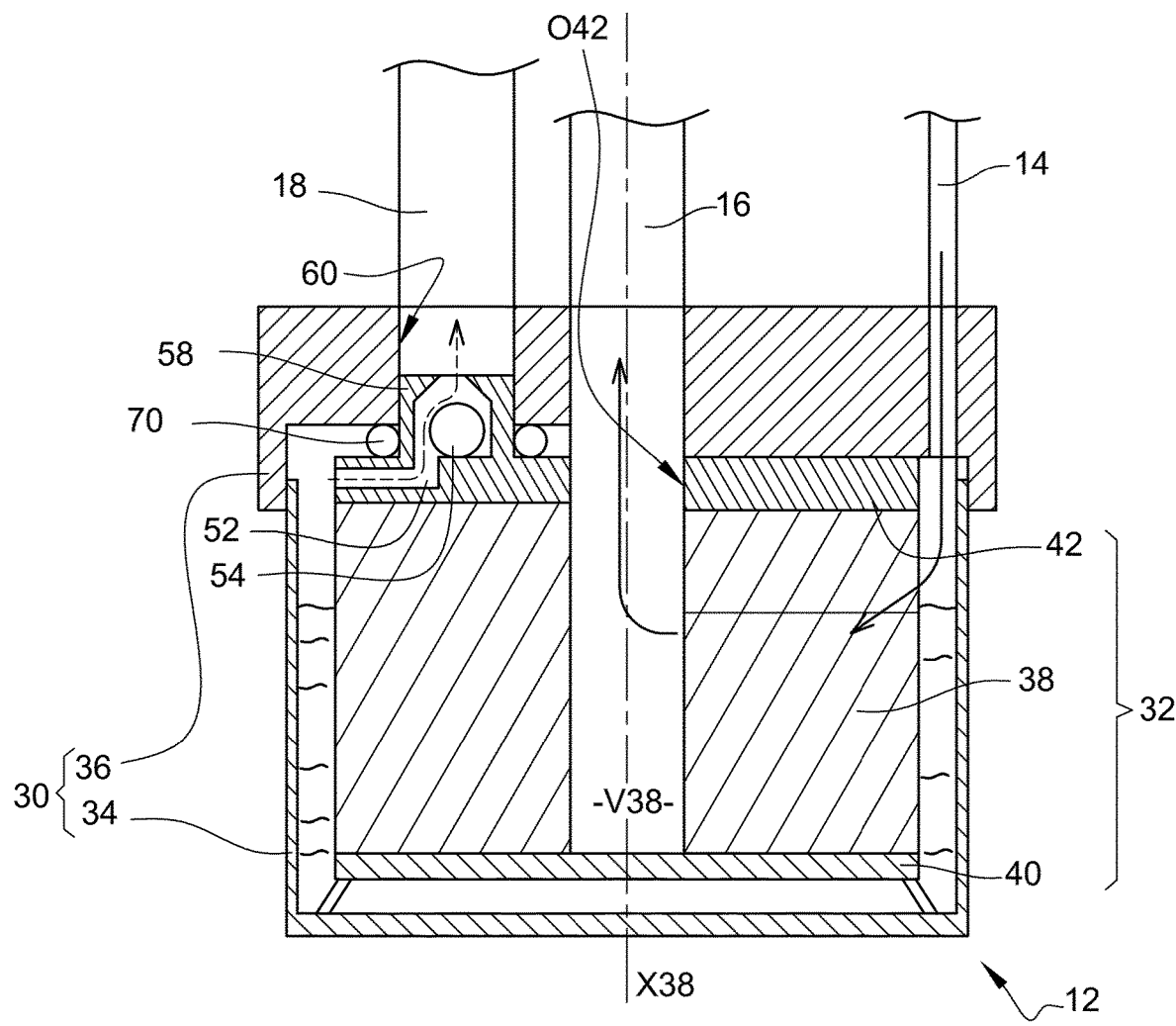
FIG. 3 is a sectional drawing of the fuel filter, wherein the degassing valve is represented in an open configuration.

As shown in FIG. 3, Filter 12 consists of a filter housing 30 inside which a filter cartridge 32 is arranged. The filter housing 30 consists of a vessel 34 and a cover 36 that is detachably attached above the vessel 34. Filter cartridge 32 may be better known as "filter element". Also, the vessel 34 can be better known as the filter casing and the cover as the flange or filter head.

In practice, the cover 36 is screwed to the vessel 34. Typically, cover 36 is fixed above vessel 34. The vessel 34 can be unscrewed from the cover 36 from below, which makes it possible to remove the filter cartridge 32 and, if necessary, replace it.

Filter cartridge 32 includes a filter media 38 which has a tubular shape centered on an axis X38: Filter media 38 defines an internal volume V38. During operation, the filter media 38 is passed through by the fuel from outside to inside. This means that the unfiltered fuel arrives in a chamber around the filter media 38, passes radially through the media 38 and reaches the internal volume V38 of the filter media 38, where it escapes through duct 16 to the engine's injection system 20.

In the example, filter media 38 has a circular cross-section.

Filter cartridge 32 comprises a lower end plate 40 and an upper end plate 42, comprising a liquid passage opening O42, which communicates with the inner volume V38 of the filter media 38. This means that, during operation, the filtered liquid contained inside the filter media 38 can escape upwards directly through the O42 opening to duct 16.

In the present document, and unless otherwise mentioned, the verb "communicate with" means that the communication is direct, i.e. that the two volumes that communicate with each other are not separated by any physical barrier. Typically, the inner volume V38 of the filter media does not communicate directly with the outer volume of the media 38 because there is the media 38 forming a physical barrier in-between.

Advantageously, the outer diameter of the two end plates 40 and 42 is equal to that of the filter media 38. Also, the inner diameter of the upper plate 42 is preferably identical to that of the filter media 38.

The upper end plate 42 includes an automatic degassing valve 50. "Automatic" means that valve 50 opens and closes automatically, without any manual action from an operator. Conversely, a purge screw, for example, is not an automatic degassing valve because purging is only done when the screw is manually removed.

In the example, valve 50 is offset from the central hole O42 of the upper end plate 42.

Figure 4:
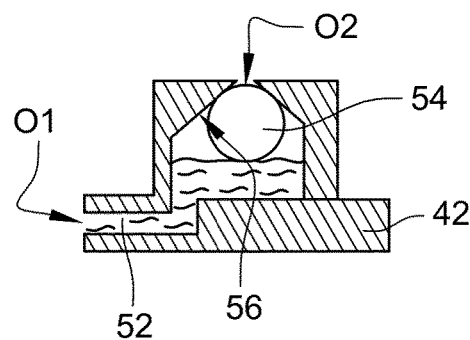
FIG. 4 is a scheme representing the degassing valve in a closed configuration.

Advantageously, and as shown in FIG. 4, valve 50 includes an upstream port, or inlet port O1 and a downstream port, or outlet port O2, which faces upwards. As valve 50 is part of the upper end plate 42, it is easy to understand that the downstream port (or orifice) is open on the side opposite the filter media 38, as is the liquid passage opening O42. Precisely, the axis of the outlet hole, i.e. the downstream port O2, is substantially parallel to the central axis X38 of the filter media 38.

Figure 5:
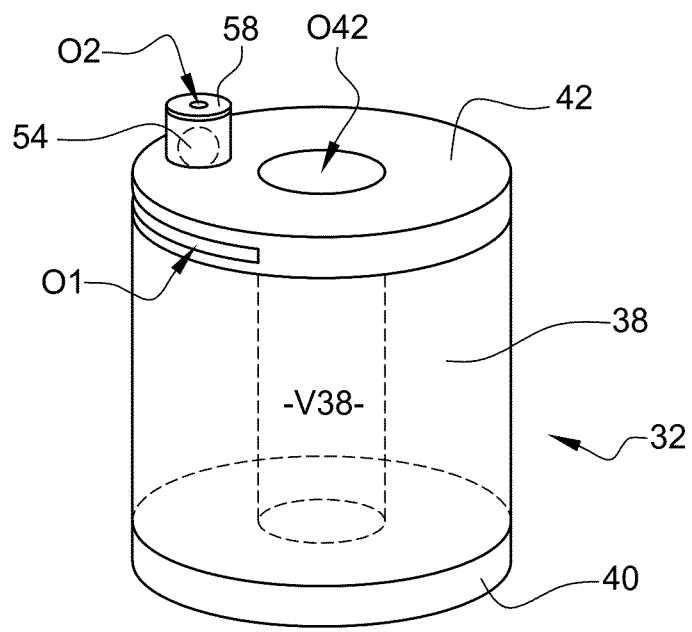
FIG. 5 is a perspective view of the filter cartridge housed inside the filter.

In this document, and in accordance with the common definition, a "port" or an "orifice" does not necessarily have to be interpreted as a hole of circular cross-section, it is more generally an opening, whatever its shape. In particular, the upstream port O1 optionally takes the form of a slot, as shown in FIG. 5.

Preferably, the upstream port O1 and the downstream port O2 are both open on the outside of the cartridge 32. Otherwise formulated, the two orifices O1 and O2 are each not in communication with the inner volume of the filter cartridge 32, i.e. they do not open into the volume V38 of the filter media 38. Specifically, the upstream port O1 opens around the upper end plate 42 and the downstream port O2 opens above the upper end plate 42.

In the construction example in the figures, valve 50 comprises a gas discharge channel 52 and a closing member 54 which, as long as the channel is filled with gas, is held, for example by gravity, in an open position (shown in FIG. 3) where it does not prevent the passage of gases through valve 50 and which rises by flotation (see FIG. 4) when channel 52 is filled with liquid, so as to close the valve in contact with a seat 56. Also, the closing member 54 has a lower density than the fuel, so that it can float on the surface of the fuel.

In the example, the closing member 54 takes the form of a ball.

More generally, valve 50 remains open as long as the pressure difference between the upstream and downstream sides is less than or equal to a pressure threshold and closes automatically when the pressure difference exceeds said pressure threshold. This means that valve 50 can close while channel 52 is still filled with gas. In this case, the closing member 54 is not moved by the force of the liquid (Archimedes' thrust), but by the pressure of the gases. However, the pressure inside the filter housing 30 increases as it fills with liquid, in this case fuel. Thus, when valve 50 closes, it means that filter housing 30 is completely or almost completely filled with liquid.

In the example, valve 50 includes a valve body, or housing 58, that protrudes upwards relative to the rest of the upper end plate. This means that valve body 58 protrudes from the side of plate 42 opposite the filter media 38.

The seat 56 is part of the valve body 58. This is a standard valve seat, so it is not useful to detail it further.

Advantageously, cover 36 has a hole 60 shaped to accommodate valve body 58. This means that hole 60 is complementary to the shape of valve body 58 and allows a male-female fitting, valve body 58 being the male part and hole 60 the female part.

Preferably, the degassing valve 50 is arranged to allow the gas to return to the fuel tank 4. Precisely, the hole 60 receiving the valve 50 is connected to a conduit 18 that carries the gases back to the fuel tank 4. This means that during the degassing phase (valve 50 open), the gases inside the filter housing 30 are evacuated to the tank 4.

A seal 70 (ring seal) is mounted around the valve body 58 to prevent liquid from passing around the body 58.

In FIGS. 2 and 3, the solid line arrows represent the passage of liquid in normal operation, while the dashed arrow represents the passage of gas.

Figure 6:
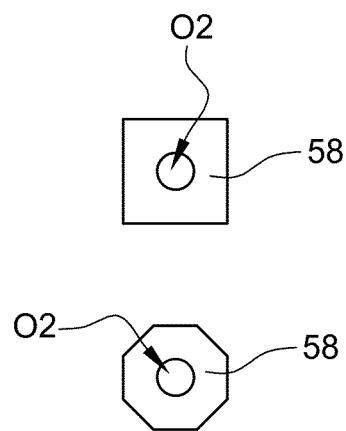
FIG. 6 includes examples of valve cross-sections.
Figure 8:
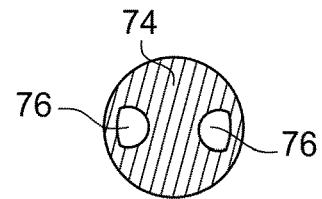
FIG. 8 is a cut view along line VIII-VIII of FIG. 7.
Figure 7:
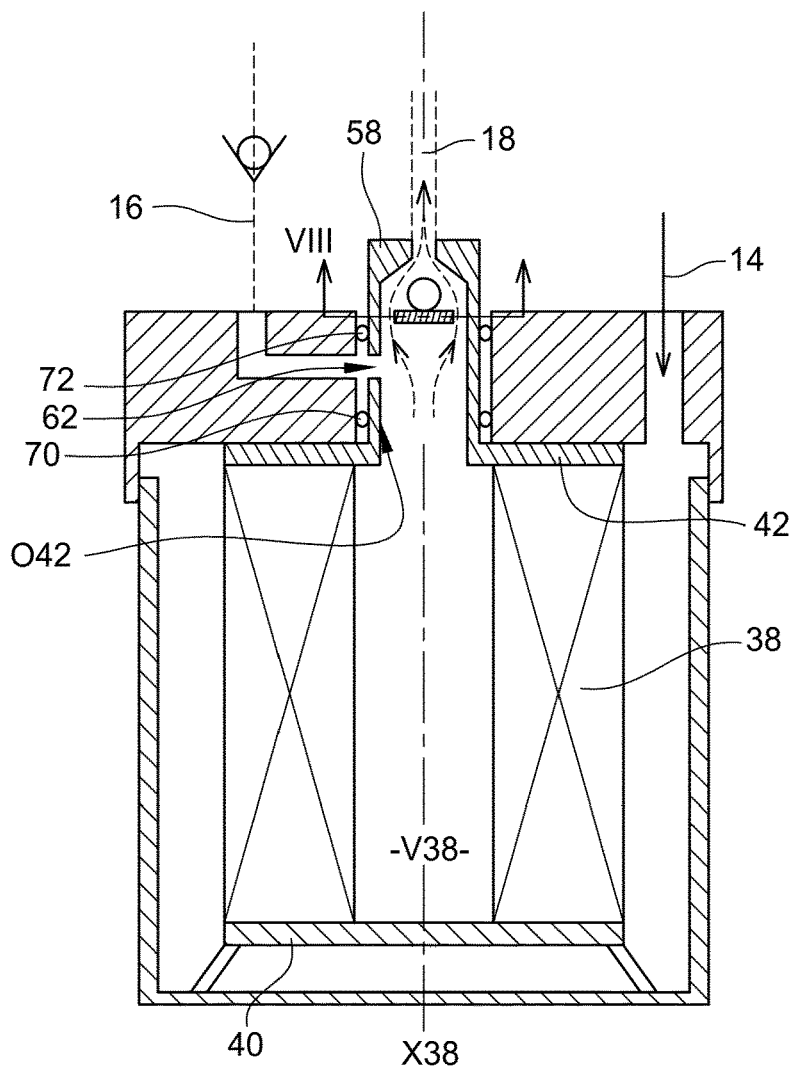
FIG. 7 is a sectional drawing (comparable to that of FIG. 3) of a fuel filter according to a second embodiment of the invention, wherein the degassing valve is represented in an open configuration.
Figure 9:
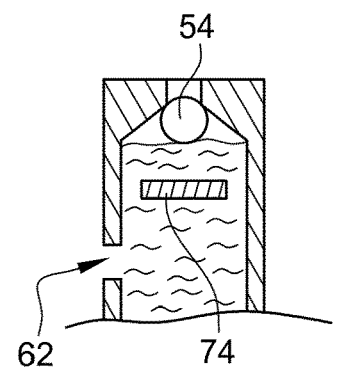
FIG. 9 is a scheme representing the degassing valve in a closed configuration.
Figure 10:
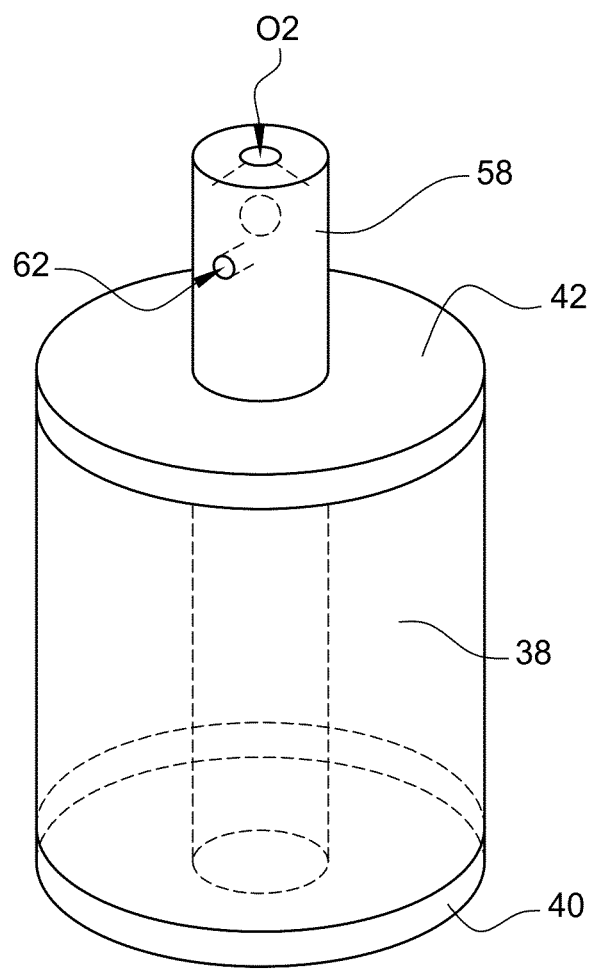
FIG. 10 is a perspective view of the filter cartridge housed inside the filter.

Optionally, and as shown in FIG. 6, valve body 58 has an outer surface of non-circular cross-section, the cross-sectional plane being parallel to the two end plates and therefore perpendicular to the central axis X38 of the filter media 38. Typically, this section can be polygonal, rectangular, etc. This makes it possible to perform mechanical coding, i.e. to avoid assembly errors, since it will not be possible to replace filter cartridge 32 with any other cartridge: the cartridge mounted for replacement must be identical to the one in place. In particular, if the cross-section of the valve body 58 is not complementary to the receiving hole delimited by the cover 36, then it will not be possible to mount the new cartridge.

FIGS. 7 to 10 show a second embodiment the invention. In the following, and in order to avoid repetitions, only the differences relative to the first embodiment are described. Also, elements comparable or identical to those of the first embodiment are designated by the same numerical references, while new elements are designated by other numerical references.

In this second embodiment, the degassing valve 50 is still part of the upper plate 42, but unlike the first embodiment, it is aligned (or positioned along) with the axis X38 of the filter media 38. Also, the degassing valve 50 is in direct communication with the internal volume V38 of the filter media 38, so that, if appropriate, the air present inside the volume V38 can escape through the valve 50.

In the example, valve 50 is formed at the top by a hollow cylinder 58 which protrudes upward, i.e. protrudes from the rest of the upper plate 42 of the filter cartridge. This cylinder 58 extends the central opening O42 of the upper plate 42 upwards. The internal volume of cylinder 58 is therefore in direct communication with the internal volume V38 of the filter media, so that the air and/or fuel in the centre of the media 38 can escape upwards towards cylinder 58.

Cylinder 58 has a first opening 62 which extends at least partially radially through the thickness of cylinder 58. In the example shown in the figures, the opening or aperture 62 is a radial hole with respect to the central axis of cylinder 58 and therefore also at the axis X38 of filter media 38 since the two axes are confused. This opening 62 is a fuel outlet opening, especially for filtered fuel. It is connected to a conduit 16 whose function is to carry fuel to the engine cylinders.

Cleverly, unlike most filter cartridges where the fuel outlet is axially upward, the fact that fuel outlet port 62 is at least partially radial with respect to the filter media axis prevents, or at least makes it difficult to fill the cartridge through this port. Indeed, it has been found that some operators in garages tend, when changing filter cartridges, to empty the fuel contained inside the old filter cartridge into the inner volume of the new filter cartridge. However, the fuel transferred is often dirty (or unfiltered), so that after the filter cartridge has been replaced, the engine is likely to be started with dirty fuel, which is obviously not desirable. This is no longer possible, or at least more difficult with the filter cartridge according to the second embodiment of the invention because orifice 62 is less accessible. The radial positioning of hole 62 therefore discourages operators from attempting to empty fuel into the new cartridge.

Cylinder 58 has a second orifice O2, which is the degassing orifice, through which the air contained inside the cartridge can escape. The orifice O2 is formed at the upper axial end of cylinder 58, i.e. at the end opposite the annular part of the upper plate 42.

The upper part of the cylinder 58 forms a valve body, and inside this valve body is housed a closing member 54, which preferably takes the form of a ball. If there is no pressure or liquid inside the cylinder 58, the closing member 54 rests on a plate 74 that is in one piece with the valve body, i.e. with the cylinder 58. This plate 74 extends perpendicular to the axis of cylinder 58 and delimits at least one, preferably two openings 76 (which are obviously smaller than the closing member 54), through which air and/or fuel can pass.

Basically, each opening 76 forms an inlet or upstream port of the degassing valve 50, the outlet or downstream port being formed by the opening O2.

In the embodiment of the figures, the closing member 54 is held, for example by gravity and as long as the cylinder 58 is filled with gas, in an open position (shown in FIG. 7) where it does not prevent the passage of gases through valve 50.

The closing member 54 rises by flotation (see FIG. 9) when the cylinder 58 is filled with liquid, so as to close the valve in contact with a seat.

More generally, valve 50 remains open as long as the pressure difference between the upstream and downstream sides of the closing member 54 is less than or equal to a pressure threshold and closes automatically when the pressure difference exceeds said pressure threshold. This means that valve 50 can close while cylinder 58 is not entirely filled with liquid. In this case, the closing member 54 is not moved by the force of the liquid (Archimedes' thrust), but by the pressure of the gases. However, the pressure inside the filter housing 30 increases as it fills with liquid, in this case fuel. Thus, when valve 50 closes, it means that filter housing 30 is completely or almost completely filled with liquid.

Advantageously, the cover 36 has a hole 60 shaped to accommodate valve body 58. This means that hole 60 is complementary to the shape of valve body 58 and allows a male-female fitting, valve body 58 being the male part and hole 60 the female part.

Also, the degassing valve 50 is preferably arranged to allow the gas to return to the fuel tank 4. Precisely, the hole 60 receiving the valve 50 is connected to a conduit 18 that carries the gases back to the fuel tank 4. This means that during the degassing phase (valve 50 open), the gases inside the filter housing 30 are evacuated to the tank 4. In a variant not shown, the conduit 18 opens to the atmosphere.

A first seal 70 (ring seal) is mounted around the valve body 58, between the opening 42 and the opening 62, to prevent liquid from passing around the body 58.

A second seal 72 (also a ring seal) is mounted around the valve body 58, between the opening 62 and the opening O2, to prevent liquid from passing around the body 58.

The conduit 16 includes a check valve (shown on FIG. 7) that prevents the gases inside the cartridge to escape by conduit 16. Indeed, the check valve only opens when the pressure upstream of it exceeds a certain threshold. Typically, when the filter cartridge is not filled with fuel, the pressure inside of it is not enough to open the check-valve and then the only way out for the gases is the degassing orifice O2.

When replacing the filter cartridge, if the operator forgets to install a new cartridge, then at least part of (if not all) the fuel arriving from conduit 14 will escape through conduit 18 and flow back to the reservoir. Then, it will be possible, for example thanks to a pressure sensor (not represented), to detect a pressure drop in the outlet conduit 16 and stop automatically the engine ("No filter no run"). Indeed, it will be possible to detect that the pressure in conduit 16 is not as high as it should be and then transmit the information to an ECU controlling the engine to stop the latter.

FIGS. 11 to 14 show a third embodiment of a filter cartridge according to the invention. In what follows, the features of the filter cartridge which are identical or similar to that of the filter cartridge according to the first or the second embodiment have the same numeral reference, while new features or distinct features have other numeral references. In addition, here below are mentioned only the differences with the first and the second embodiments: For concision purpose, the features of the third embodiment that are common to the first or the second embodiment are not described one more time.

Figure 11:
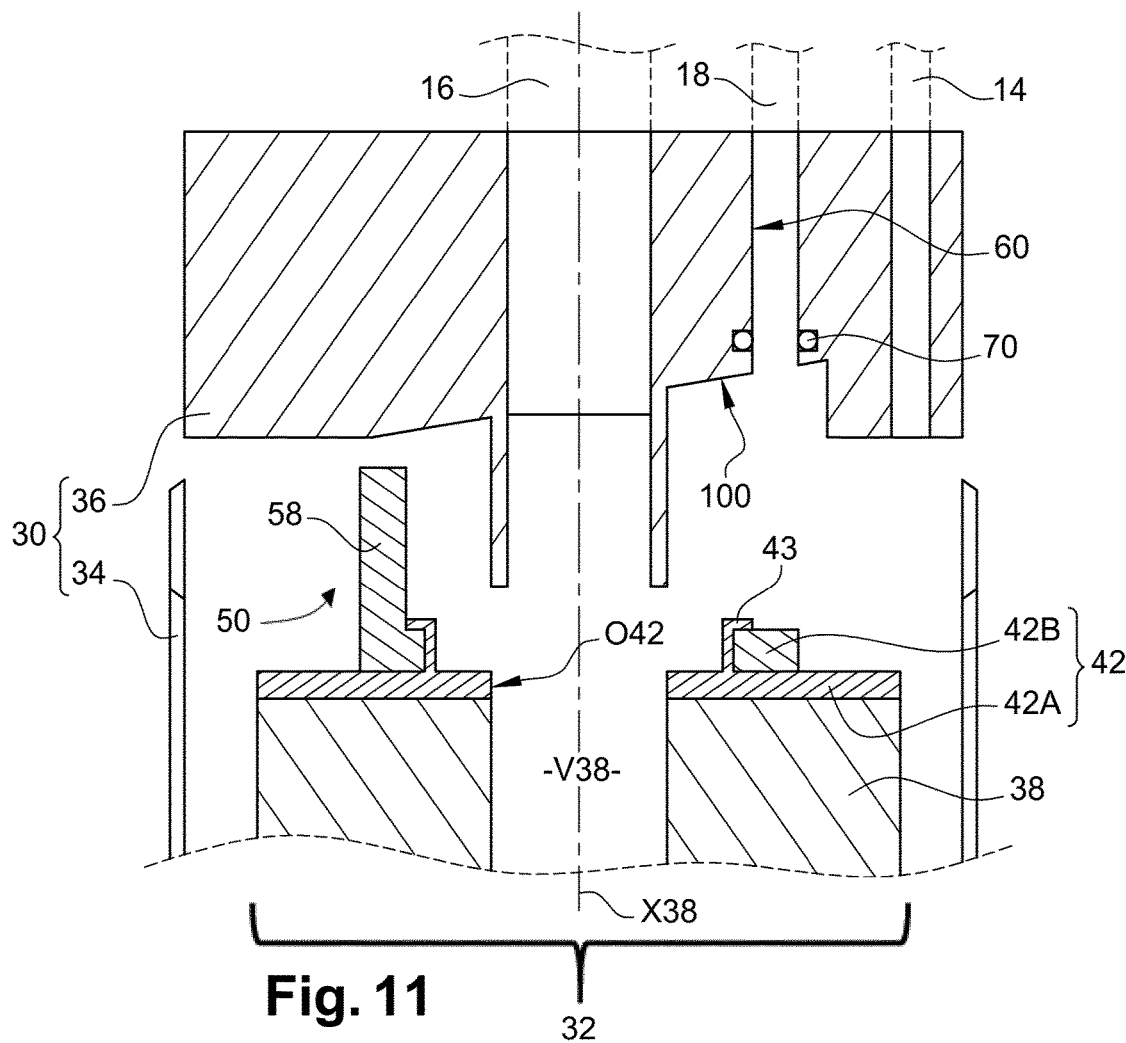
FIGS. 11 to 14 show a third embodiment of a fuel filter according to the invention.

As shown on FIG. 11, the filter cartridge 32 according to the third embodiment is specific in that the top plate 42 is made out of two distinct parts 42A and 42B. Part 42A is disc-shaped and is attached on top of the filter media 38. Part 42A has an outer diameter and an inner diameter which are identical to that of the filter media 38. Part 42B is a rotating ring, that is free to rotate relative to the part 42A. The axis of rotation of the rotating ring 42B is advantageously confounded with the central axis of the filter media (and of the part 42A).

The parts 42A and 42B of the top plate are attached one with the other. In the example, the part 42B is clipped on top of the part 42A, meaning that the part 42B is attached above part 42A. Precisely, part 42B includes a clip 43, i.e. a flexible device for holding parts 42A and 42B together. In the mounted configuration, the clip 43 prevents the rotating ring 42B from detaching. The clip 43 is a flexible ring-shaped portion, comprising an elbow-shaped tongue that partially overlaps the rotating ring 42B to hold it in place.

In this embodiment, the top plate 42 also includes an automatic degassing valve 50 which belongs to the rotating ring 42B.

In the example, valve 50 includes a valve body, or housing 58 (a.k.a "pin"), that protrudes upwards relative to the rest of the rotating ring 42B. This means that valve body 58 protrudes from the side of part 42B opposite the filter media 38.

Advantageously, cover 36 has a hole 60 shaped to accommodate valve body 58. This means that hole 60 is complementary to the shape of valve body 58 and allows a male-female fitting, valve body 58 being the male part and hole 60 the female part.

Preferably, the degassing valve 50 is arranged to allow the gas to return to the fuel tank 4. Precisely, the hole 60 receiving the valve 50 is connected to a conduit 18 that carries the gases back to the fuel tank 4. This means that during the degassing phase (valve 50 open), the gases inside the filter housing 30 are evacuated to the tank 4.

A seal 70 (ring seal) is received inside an annular groove formed on the wall of the hole 60. Seal 70 prevents liquid from passing around the body 58. In a variant not shown, the seal ring 70 can be provided around the pin 58.

The filter element 32 is received inside a filter shell (a.k.a "filter housing") 30. The filter housing 30 consists of a vessel 34 and a cover 36 that is detachably attached above the vessel 34.

In practice, the cover 36 is screwed to the vessel 34. Typically, cover 36 is fixed above vessel 34. The vessel 34 can be unscrewed from the cover 36 from below, which makes it possible to remove the filter cartridge 32 and, if necessary, replace it.

In this embodiment, the vessel 34 and the cartridge 32 are secured one with the other, so that the cartridge 32 rotates conjointly with the vessel 34 when the latter is screwed around or inside the cover 36. In other words, the cartridge 32 is not free to rotate relative to the vessel 34. However, and since the part 42B can rotate relative to part 42A, the rotating ring 42B can also rotate relative to the vessel 34.

In practice, any appropriate fixing means can be used to secure the filter cartridge 32 inside the vessel 34. Typically, a clipping means can be provided to secure the filter cartridge 32 inside the vessel 34.

Since this fixing means is already known in itself, and widely used, it has not been detailed further.

Preferably, filter 12 according to this third embodiment is a "spin-on" fuel filter design which is to be unscrewed from its mount, discarded, and replaced with a new one. However, in an alternative embodiment, filter 12 can be of "cartridge" (or "replaceable element") construction, in which the housing is a permanent housing that contains the replaceable filter element or cartridge.

In this embodiment, the cover 36 is specific in that it delimits a guiding surface 100, which is in the form of an elliptic surface. The guiding surface is inclined relative to a plane perpendicular to the central axis of the filter 12. In other words, the guiding surface corresponds to the intersection of a tube with a plane that is not perpendicular to the central axis of the tube (inclined plane).

The guiding surface 100 is designed for guiding the pin 58 towards the hole 60 when the assembly comprising the vessel 34 and the filter cartridge 32 is assembled at the bottom of the cover 36.

Typically, when the filter cartridge 32 needs to be replaced, the operator proceeds firstly with dismounting it by unscrewing the vessel 34 from the top cover 36. When the operator starts to unscrew the vessel 34, the rotating ring 42B remains immobile as the pin 58 is blocked in rotation because it is engaged in the receiving hole 60. As soon as the pin 58 gets out of the hole 60, it is no more blocked in rotation and moves along with the filter element 32.

Afterwards, a new filter cartridge assembly is mounted below the cover: See FIG. 11. The vessel 34 can be kept ("cartridge" design) or thrown away ("spin-on" design).

When the operator starts screwing the vessel 34 around or inside the top cover 36, the pin 58 abuts against the guiding surface 100 of the cover 36 (there is no need to orient the pin 58 exactly in front of the hole 60). Then, the screwing movement (which includes a rotation and a translation) forces the pin 58 to move along the guiding surface 100.

The pin 58 can move in the same direction that the screwing motion, or in the opposite direction, depending on the location at which it abuts against the cover surface 100. Typically, if the pin 58 is close to the hole 60 but that the screwing rotation motion tends to move the pin away from the hole 60, then the inclined nature of the guiding surface 100 will prevent the pin 58 from moving in that direction and will force the pin 58 to move in the other direction and reach the hole 60. This is made possible thanks to the fact that the rotating ring 42B to which belongs the pin 58 can rotate relative to the rest of the filter element 32. Then, the pin 58 can rotate in one direction even though the rest of the filter element 32 rotates in the other direction.

It is therefore to be understood that the pin 58 is automatically oriented towards its final position during the assembly operation, meaning that the operator does not have to orient the filter cartridge in a way that the pin 58 penetrates into the hole 60.

When the pin 58 reaches the hole 60, the rotating ring 42B stops rotating. The filter cartridge (and the vessel 34), however, keeps turning until screwing motion is complete. By pursuing the screwing movement, the pin 58 is pushed inside the hole 60 to reach the position of FIG. 14.

One advantage to this specific filter design is that if one tries to replace the filter cartridge 32 by a cartridge of a different design, then the hole 60 will not be plugged and all of the fuel will flow back to the reservoir 4 through line 18. Accordingly, this special design ensures that the engine will not run if an inappropriate filter element (or if no filter) is assembled inside the housing 30: This safety feature is called "No filter, No run", as mentioned above.

Figure 12:
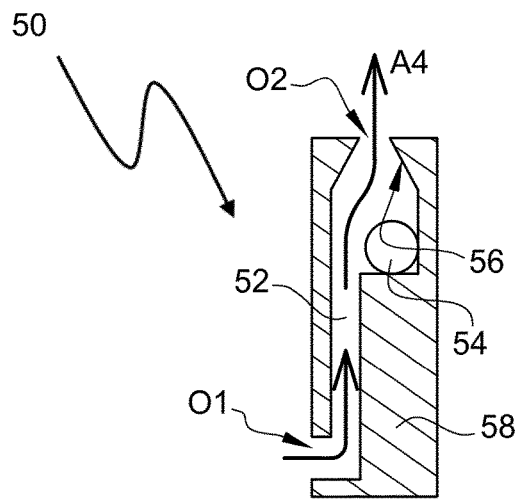
Figure 13:
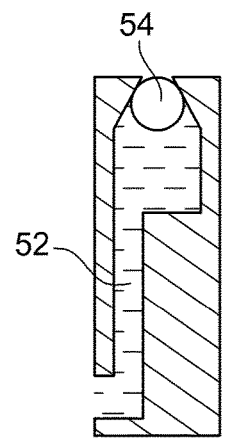

When the pin 58 is engaged in the hole 60, the degassing valve 50 works exactly like the one of the first and second embodiment (See FIGS. 12 and 13). The valve 50 is open as long as the pressure upstream of the ball 54 is below a certain threshold (e.g. when the inlet conduit 52 is filled up with gas: See FIG. 12) and automatically closes when the pressure exceeds such pressure threshold (e.g. when the inlet conduit 52 is filled up with fuel: See FIG. 13).

Figure 14:
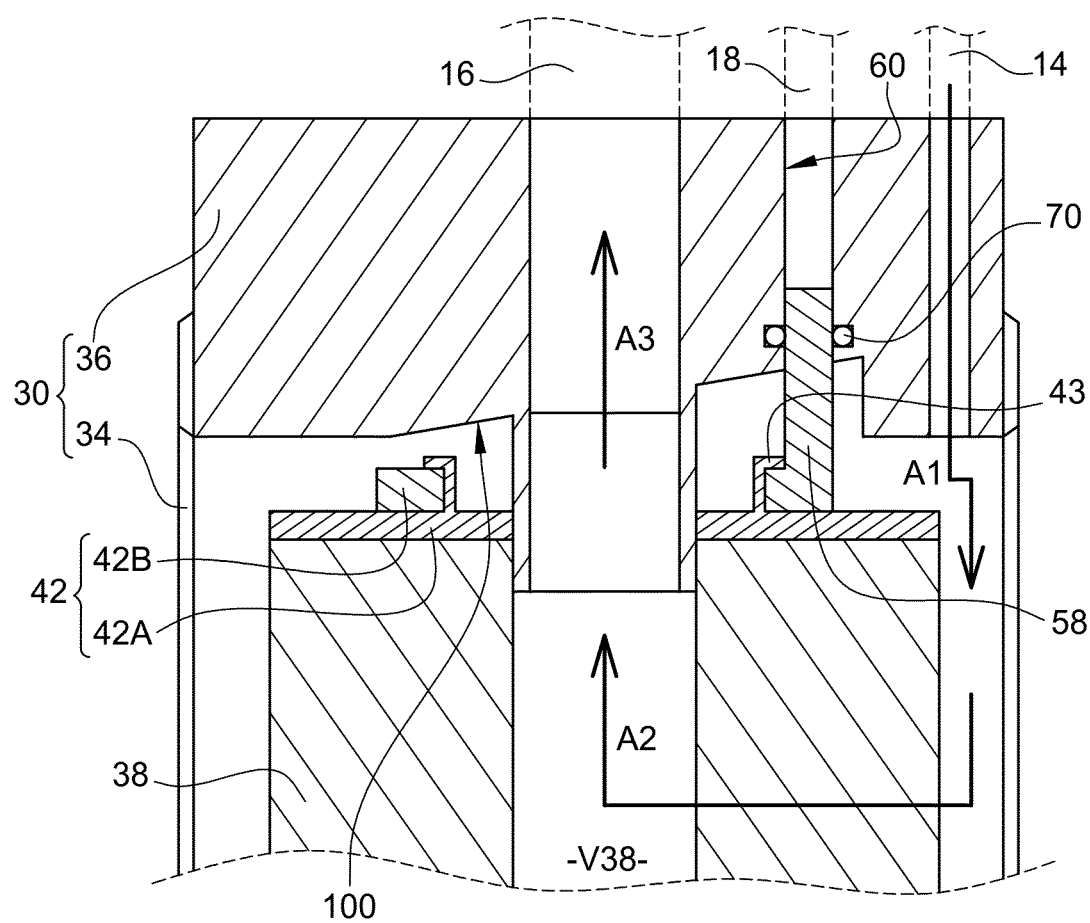

In connection with FIG. 14, when the filter element 32 is properly connected to the top cover 36, Air or gas contained inside the housing 30 escapes through the degassing valve 50 and flows back to the reservoir. Precisely, the gas enters inside the pin 58 through orifice O1, flows through conduit 52 and escapes by orifice O2 (See FIG. 12, Arrow A4). Afterwards, the gas flows through conduit 18 back to the reservoir 4.

In operation, unfiltered fuel arrives from conduit 14 to the outside volume of filter media 38, as represented by arrow A1. Fuel flows then radially through the filter media 38 (As represented by arrow A2) and escapes through conduit 16 to the engine (As represented by arrow A3). In a variant not shown, the filter cartridge 32 of FIG. 3 further includes a rotating ring that is attached to the top plate 42. As its name indicates, this rotating ring would be capable of rotating relative to the top plate 42. This rotating ring is secured in rotation with the vessel 34. This rotating ring enables to create a degree of freedom of the assembly comprising the filter media 38 and the end plates 40, 42 relative to the vessel 34, meaning that the assembly formed by the filter media 38 and the end plates 40, 42 can rotate relative to the vessel 34 (around axis X38). Accordingly, when the assembly formed by the vessel 34 and the cartridge 32 is assembled below the top cover 36 (e.g. when the vessel 34 is screwed to the cover 36), the pin 58 first abuts against a guiding surface of the top cover 36 (similar to the embodiment of FIG. 11). Then, the pin 58 is first automatically driven in rotation (thanks to the guiding surface provided on the top cover 36) to reach the receiving hole 60 arranged in the top cover 36. As soon as the pin 58 penetrates into the hole 60, the assembly formed by the filter media 38 and the end plates 40, 42 stops rotating. By continuing to turn and push the vessel 34 upwards, this assembly is driven in translation by the screwing motion of the vessel 34 relative to the cover 36 to make the pin 58 fully penetrate inside the hole 60 and reach its final mounting position. This is exactly the same motion than that described in connection with FIG. 11, that is why it is not detailed here once again.

In a variant not shown, the degassing valve 50 is located on the outside of the filter media 38. In this case, the upper end plate 42 has a larger maximum diameter than the filter media 38. Also, the upstream port O1 opens below the upper end plate 42.

According to another variant not shown, the closing member 54 is guided inside a vertical rail, for example of rectangular cross-section.

According to another variant not shown, the cylinder 58 comprises an outer thread and the hole 60 of the cover 36 comprises a complementary inner thread, so that the cylinder 58 of the filter cartridge may be secured to the cover 36 by these thread connection means.

According to another variant not shown, the cylinder 58 in not in one piece with the annular part of the upper end plate 42 but is secured to it by any suitable means (welding, gluing, etc.). More generally, in this paper, the fact that the degassing valve 50 "is part of" the upper end plate means that the two elements are secured one with the other, but do not necessarily form one piece.

It is to be understood that the present invention is not limited to the embodiment(s) described above and illustrated in the drawings; rather, the skilled person will recognize that many changes and modifications may be made within the scope of the appended claims.

The invention claimed is:

1. A filter cartridge for a liquid such as fuel, said filter cartridge being intended to be positioned inside a filter housing and comprising:
   a filter media defining an inner volume,
   a lower end plate, and
   an upper end plate, including a liquid passage opening, which communicates with the inner volume of the filter media,
wherein the upper end plate includes an automatic degassing valve, and
wherein the valve comprises a gas discharge channel and a closing member which; as long as the channel is filled with gas, is held in an open position where it does not oppose the passage of gases through the valve and which floats when the channel is filled with liquid, so as to close the valve in contact with a seat.

2. Filter cartridge according to claim 1, wherein the valve comprises an upstream port and a downstream port which faces upward.

3. Filter cartridge according to claim 2, wherein the valve remains open as long as the pressure difference between the upstream and downstream sides is less than or equal to a pressure threshold and closes automatically when the pressure difference exceeds said pressure threshold.

4. Filter cartridge according to claim 1, wherein the valve comprises an upstream port and a downstream port that do not communicate with the inner volume of the media.

5. Filter cartridge according to claim 1, wherein the valve comprises an upstream port and a downstream port that both communicate with the inner volume of the media.

6. Filter cartridge according to claim 1, wherein the valve comprises a valve body 1 which protrudes upwardly with respect to the remainder of the upper end plate.

7. Filter cartridge according to claim 6, wherein the valve body is arranged at the centre of the upper end plate 1.

8. Filter cartridge according to claim 1, wherein the upper end plate comprises a cylinder which protrudes upwardly with respect to the remainder of the upper end plate and the cylinder delimits an opening that extends at least partially in a radial direction with respect to a central axis of the cylinder.

9. Filter cartridge according to claim 8, wherein a closing member of the degassing valve is housed inside the cylinder.

10. Filter cartridge according to claim 1, wherein the outer diameter of the two end plates is equal to that of the filter media.

11. Filter cartridge according to claim 1, wherein the inner diameter of the upper end plate is the same as that of the filter media.

12. Filter cartridge according to claim 1, wherein the upper end plate includes a first part and a second part that is free to rotate relative to the first part and in that the degassing valve is arranged on the second part.

13. A filter, comprising a filter housing, comprising a vessel a cover removably attached to the vessel, and
 a filter cartridge arranged inside the filter housing, wherein the filter cartridge is according to claim 1.

14. Filter according to claim 13, wherein the valve comprises a valve body which protrudes upwardly with respect to the remainder of the upper end plate and in that the cover comprises a hole shaped to receive the valve body.

15. Filter according to claim 14, wherein the hole of the cover has a non-circular shape.

16. A vehicle, in particular a heavy-duty vehicle such as a bus, a truck or a construction vehicle, wherein the vehicle comprises a filter according to claim 13.

17. Vehicle according to claim 16, wherein the degassing valve is arranged to allow the gas to return to the fuel tank.

\* \* \* \* \*